(12) United States Patent
Maeda et al.

(10) Patent No.: US 6,335,711 B1
(45) Date of Patent: Jan. 1, 2002

(54) HEAD-MOUNTED PICTURE DISPLAY DEVICE

(75) Inventors: Yoshihiro Maeda; Motohiro Atsumi, both of Hachioji; Kunio Yamamiya, Sagamihara, all of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/290,119

(22) Filed: Apr. 12, 1999

(30) Foreign Application Priority Data

Apr. 13, 1998 (JP) .......................................... 10-101478

(51) Int. Cl.⁷ ................................................ G09G 5/00
(52) U.S. Cl. .................................... 345/8; 345/7; 345/9
(58) Field of Search ............................... 345/8, 905, 7, 345/9; 359/630; 351/158

(56) References Cited

U.S. PATENT DOCUMENTS

| | | | |
|---|---|---|---|
| 5,671,037 A | * 9/1997 | Ogasawara et al. | 351/158 |
| 5,767,820 A | * 6/1998 | Bassett et al. | 345/8 |
| 5,835,277 A | * 11/1998 | Hegg | 359/630 |
| 5,844,530 A | * 12/1998 | Tosaki | 345/8 |
| 5,991,085 A | * 11/1999 | Rallison et al. | 359/630 |

FOREIGN PATENT DOCUMENTS

| | | |
|---|---|---|
| JP | 5264946 | 10/1993 |
| JP | 6141258 | 5/1994 |
| JP | 9130703 | 5/1997 |
| JP | 9266554 | 10/1997 |

* cited by examiner

*Primary Examiner*—Chanh Nguyen
*Assistant Examiner*—Fritz Alphonse
(74) *Attorney, Agent, or Firm*—Ostrolenk, Faber, Gerb & Soffen, LLP

(57) ABSTRACT

A main unit of an HMD that is a head-mounted picture display device of the present invention can be mounted on the observer's head. The main unit has a front cover and back cover constituting a housing body that accommodates LCDs serving as picture display members, and prisms. The front cover and back cover are unitedly secured by inserting headed screws from the back cover with projections fitted into inner circumferential parts. The front cover has two surfaces lying along lines inclined upward and downward from apices toward the back cover. The main unit is retained at a viewable position, located closely to or in contact with the observer's head, in front of observer's eyes. The adoption of this shape of the housing body permits a lightweight design of the main unit and enables long-term use thereof.

7 Claims, 6 Drawing Sheets

HEAD-MOUNTED PICTURE DISPLAY DEVICE

BACKGROUND OF THE INVENTION

1. Field of the Invention

The present invention relates to a head-mounted picture display device having optical systems for projecting pictures formed on picture display members so as to be visualized by the observer.

2. Description of the Related Art

In recent years, various head-mounted picture display devices including a so-called head-mounted display (hereinafter an HMD) have been proposed as compact display devices used to display and enjoy pictures or play various kinds of games. The head-mounted picture display device has been put to practical use for such purposes.

For example, an eyeglasses-like picture display device has been disclosed in Japanese Unexamined Patent Publication No. 5-264946. Herein, the face 51 of a main unit 50 thereof is, as shown in the perspective view of FIG. 7, formed with a convex translucent member. The top 52, bottom 54, and back 53 of the main unit 50 are formed with opaque plane members. The main unit is formed as a whole with a hollow housing that is part of a hollow cylinder. A pair of eyepiece windows 53a is formed in the back 53 of the main unit 50 at positions at which they will be placed to oppose the observer's left and right eyes during use. Moreover, a nose rest portion 54a shaped like an inverted letter V is formed in the center of the bottom 54. Furthermore, left and right supporting frames 55 capable of being mounted on the observer's head are attached to the main unit 50.

However, in the eyeglasses-like picture display device disclosed in the Japanese Unexamined Patent Publication No. 5-264946, when the main unit 50 is mounted on the head, a pair of bows must be hung on the left and right ears. Since the main unit 50 is shaped like part of a cylinder, it is heavy and bulky as a whole. Moreover, since a translucent member and opaque members are united with one another, workability is poor in terms of maintenance of optical parts and other units incorporated in the main unit. Consequently, the handling efficiency of the device is very poor.

SUMMARY OF THE INVENTION

The present invention attempts to resolve the foregoing drawbacks. An object of the present invention is to provide a user-friendly head-mounted picture display device having a lightweight main unit and capable of withstanding long-term use.

A head-mounted picture display device in accordance with the present invention comprises predetermined picture display members, optical systems, and a housing body. The optical systems project pictures formed on the picture display members to be viewed by the observer. The housing body accommodates the picture display members and optical systems and retains them at viewable positions at which they lie closely to or in contact with the observer's head. The housing body has a pair of window frames located at positions at which when the observer assumes a predetermined viewing posture, the window frames are opposed to the observer's eyes. A back cover member holds transparent window members in the window frames. A front cover member is fixed unitedly to the back cover member. Vertical cross-sections thereof passing substantially through the centers of the pair of window frames are each shaped to have an apex or convex part projecting in a direction opposite to the window frames. Moreover, the vertical cross-sections each have two surfaces which extend along lines inclined upward and downward from near the apex or convex part towards each window frame.

According to the present invention, the head-mounted picture display device comprising the foregoing members can provide a lightweight main unit, can withstand long-term use, and is user-friendly.

Other features and advantages of the present invention will be fully apparent from the description below.

DESCRIPTION OF THE PREFERRED EMBODIMENT

An embodiment of the present invention will be described in conjunction with the drawings below.

Figure 1:
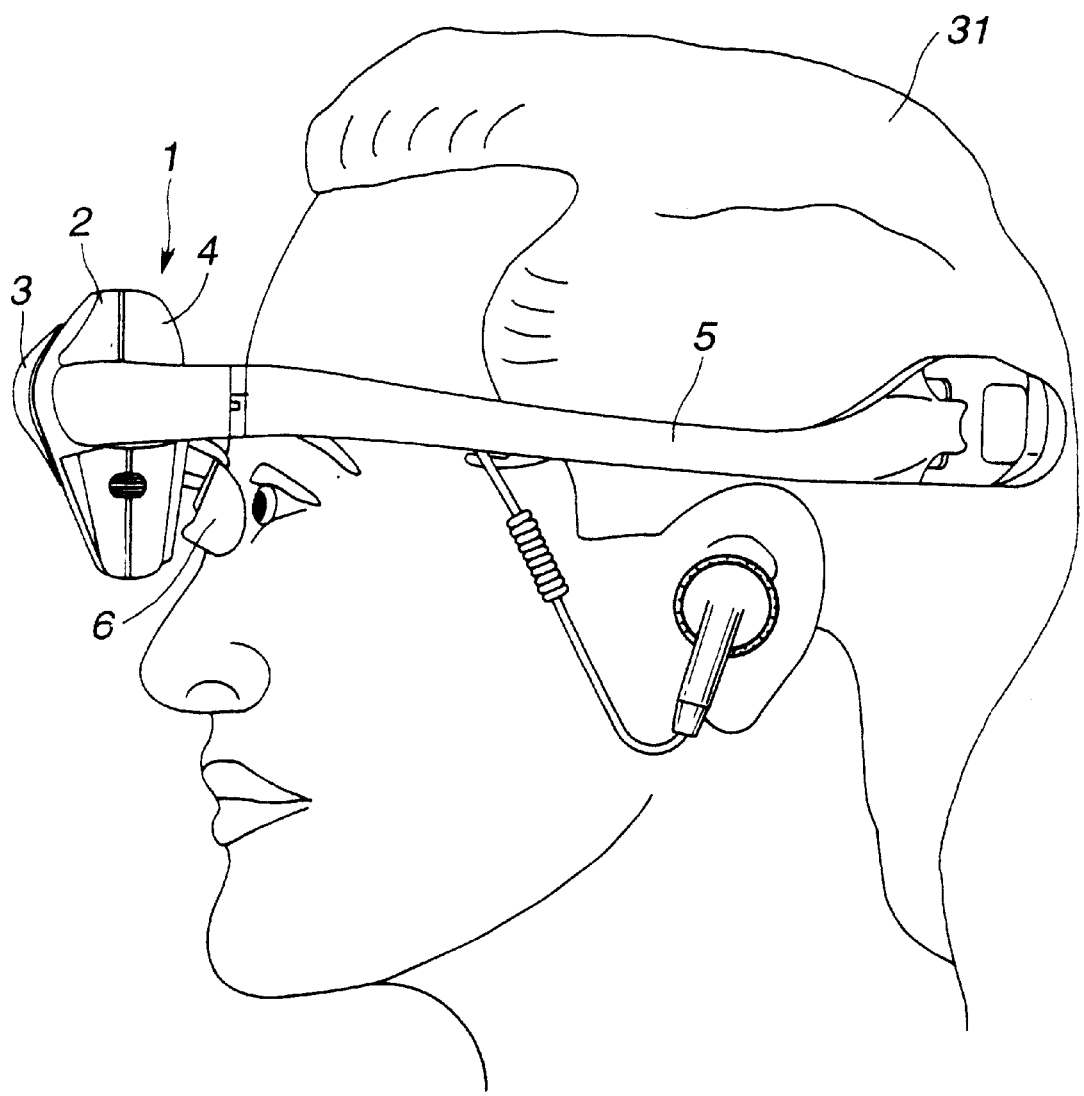
FIG. 1 is a side view showing an HMD, which is a head-mounted picture display device of an embodiment of the present invention, mounted on a user's head.
Figure 2:
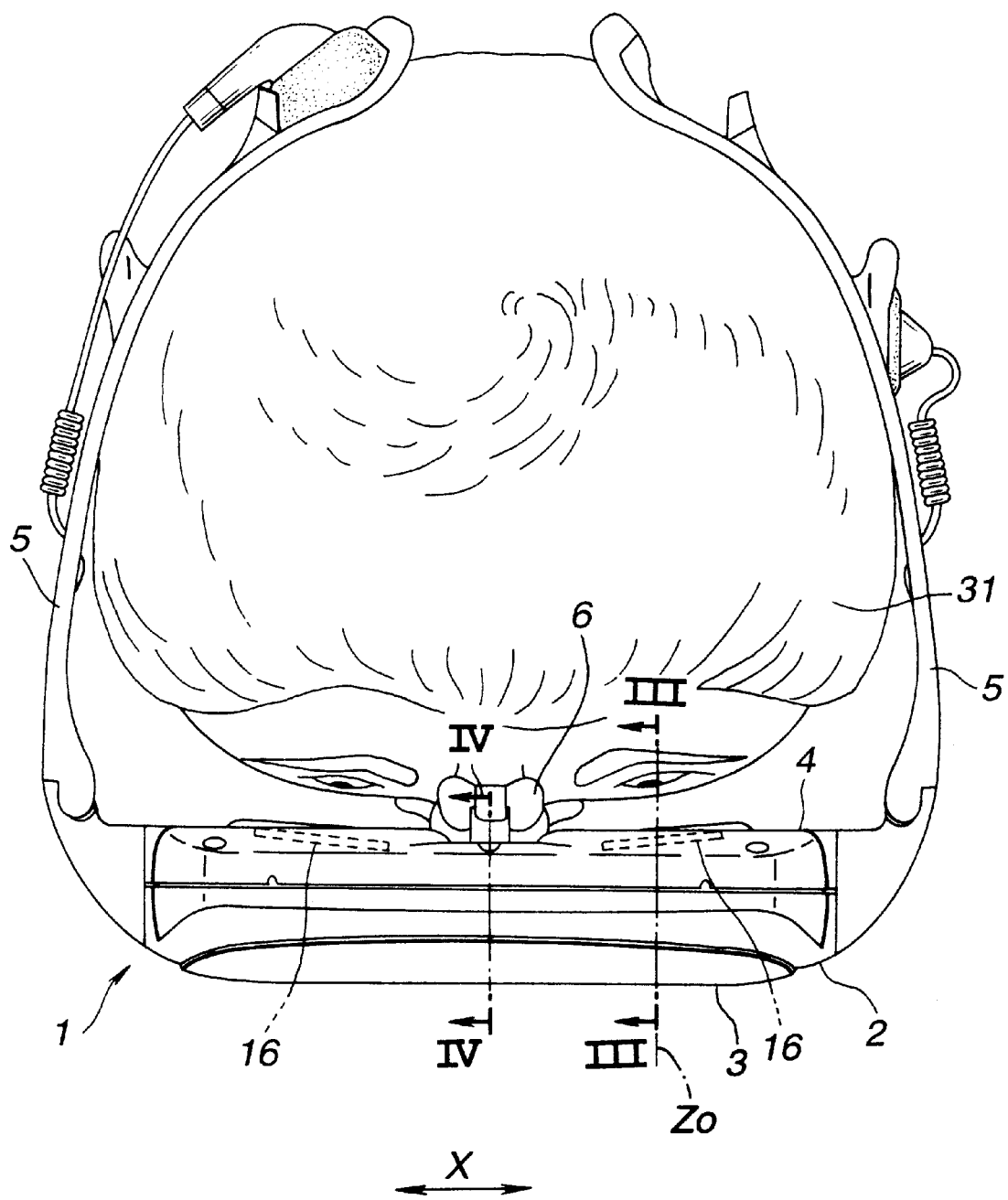
FIG. 2 is a plan view showing the HMD mounted on the user's head as shown in FIG. 1.
Figure 3:
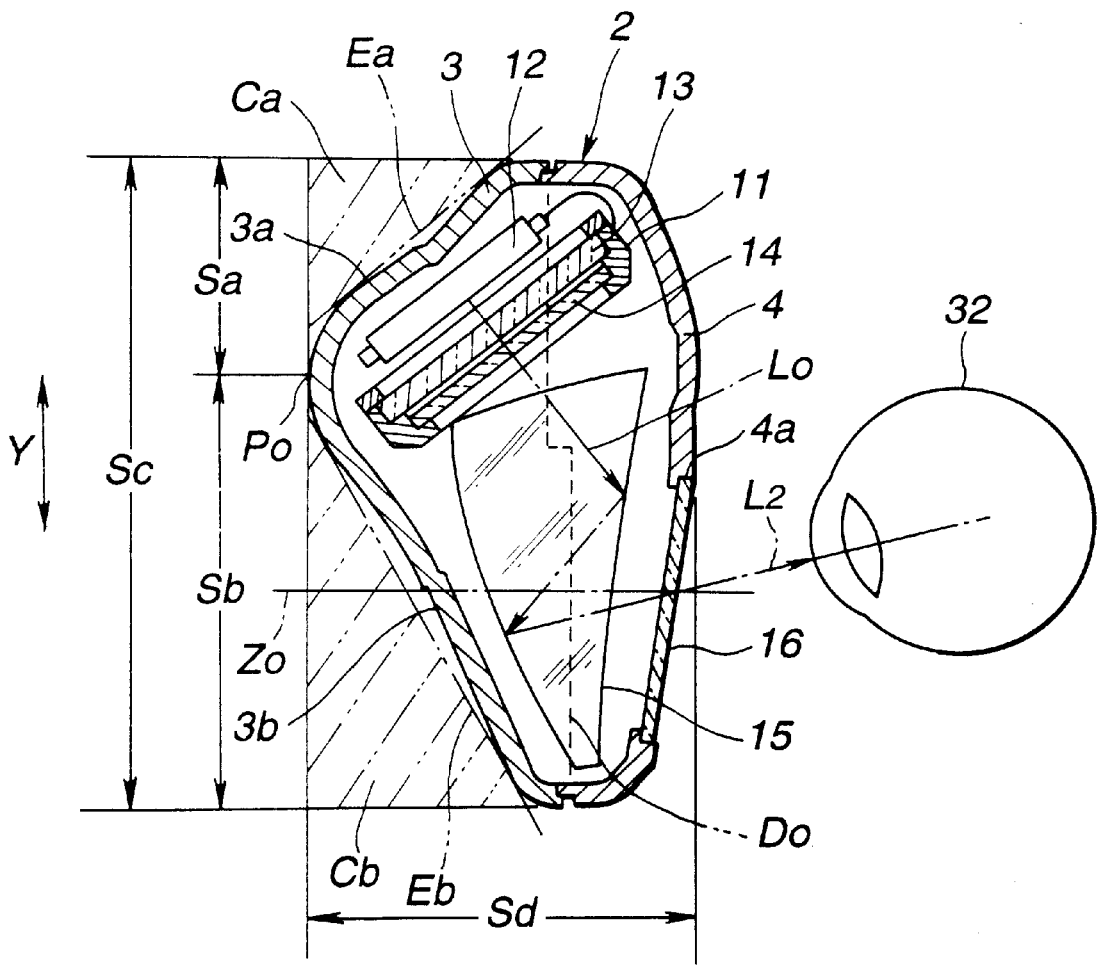
FIG. 3 is a cross sectional view through the III—III cutting plane of the HMD shown in FIG. 2.
Figure 4:
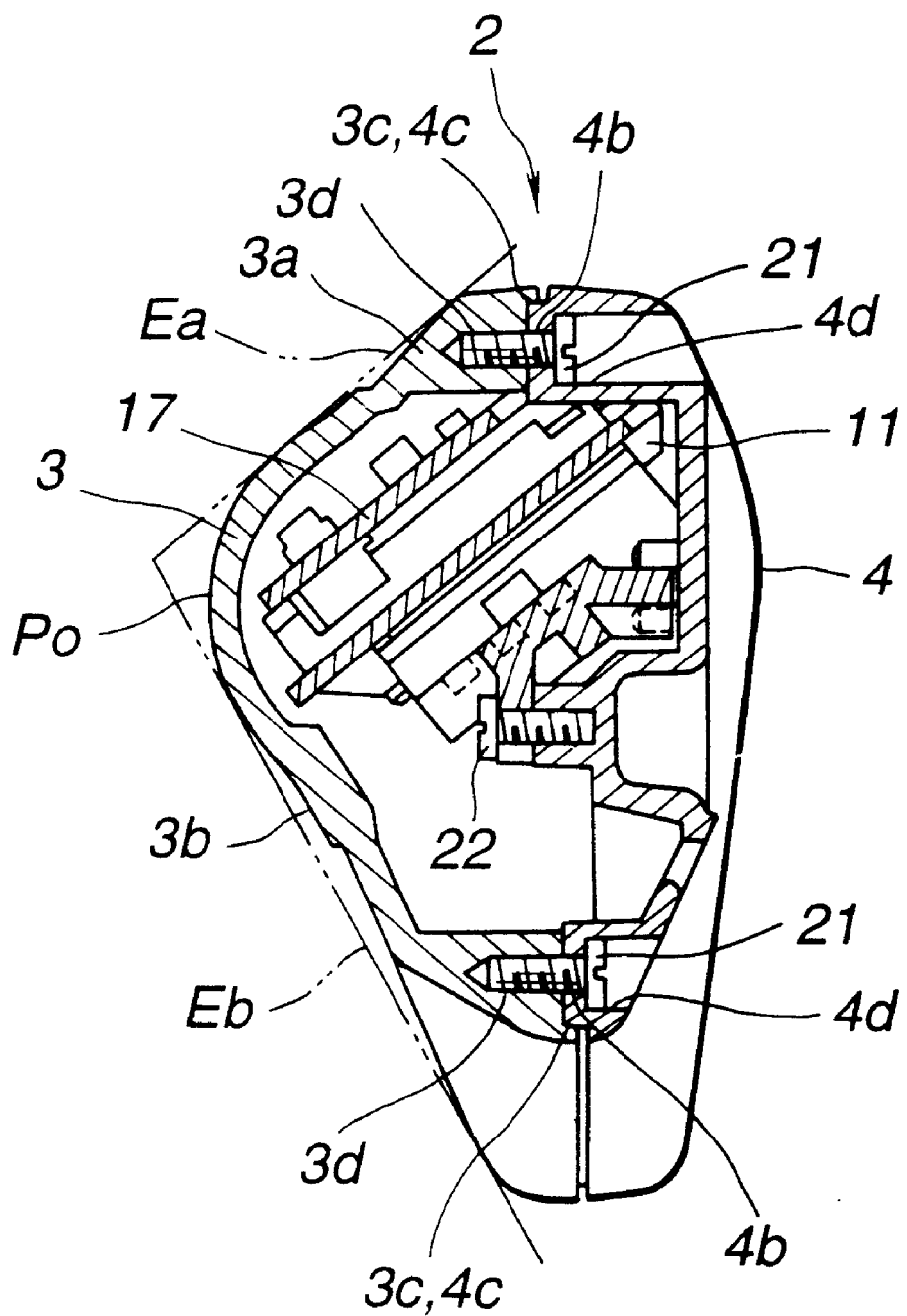
FIG. 4 is a cross sectional view through the IV—IV cutting plane of the HMD shown in FIG. 2.

FIG. 1 is a side view showing an HMD 1, which is a head-mounted picture display device of an embodiment of the present invention, mounted on a user's head. FIG. 2 is a plan view showing the HMD 1 mounted on a user's head. FIG. 3 and FIG. 4 are cross sectional views of a main unit of the HMD 1. FIG. 3 is a cross sectional view of the main unit of the HMD 1 shown in FIG. 2, along the plane designated as III—III and FIG. 4 is a cross-sectional view thereof along the plane designated as IV—IV.

The HMD 1 comprises a main unit 2, left and right supporting frames 5, and a nose rest portion 6. The main unit 2 serves as a housing body and consists of a front cover 3 and a back cover 4. The housing body has, as shown in FIG. 3 and FIG. 4, a picture visualization unit incorporated therein. Moreover, the housing body retains, as shown in FIG. 1 and FIG. 2, the picture visualization unit at viewable positions at which they lie closely to or in contact with the observer's head 31. The left and right supporting frames 5 extend along the left and right sides of the observer's head 31 from the left and right ends of the main unit 2. The left and right supporting frames thus hold the main unit 2 in front of the eyes of the head 31 with the HMD 1 mounted on the head 31. The nose rest portion 6 is sustained by the main unit 2. A video signal, voice signal, and power are supplied to the HMD 1 via a controller that is not shown.

The picture visualization unit incorporated in the main unit 2 that is a housing body comprises a supporting frame 11, a pair of left and right backlights 12, a pair of left and right transparent LCDs 13, a pair of left and right optical filters 14, a pair of left and right prisms 15, a pair of left and right transparent window members 16, and an electrical printed-circuit board 17. The supporting frame 11 is a structure for supporting the incorporated members. The transparent LCDs 13 serve as picture display members. The prisms 15 serve as optical systems for projecting pictures formed on the LCDs 13 to the observer's eyes 32. The transparent window members 16 are fitted in back cover window frames 4a located in front of the prisms 15. Moreover, the electrical printed-circuit board 17 controls and drives the control members.

Incidentally, the supporting frame 11 is, as shown in FIG. 4, fixed to the back cover 4 using a screw 22. The front cover 3 and back cover 4 constituting the main unit 2 are united with each other along a coupling plane D0 indicated with a dashed line in FIG. 3 by means of headed screws 21 passed through screw holes 4b. In the joined state, projections 4c of the back cover 4 are fitted into inner circumferential parts 3c of the front cover 3. The back and front covers are thus coupled and fixed to each other.

The advantage provided by the foregoing structures of the coupled front and back covers will be described below. The coupling plane D0 is stepped so that the lower part thereof is located so as to be positioned more closely to the user's eyes 32 than the upper part thereof with a center line as a boundary. As shown in FIG. 3, an upper angular area Ca defined along on surface of the front cover is larger than a lower angular area Cb defined along another surface thereof. This results in a small internal space between the front cover 3 and the incorporated parts (for example, the prisms 15). Thus, the HMD can be designed to be lightweight.

Now, a description will be made of the cross sectional shape of the main unit 2. The lateral direction in the plan view of FIG. 2 shall be regarded as an X direction, and the vertical direction relative to the surface of FIG. 2 shall be regarded as a Y direction. An axis passing through the center of each transparent window member 16 and extending in a direction orthogonal to the X and Y directions shall be referred to as a window center axis Z0.

FIG. 3 is a cross sectional view across the III—III cutting plane of the main unit shown in FIG. 2. Specifically, FIG. 3 shows a vertical cross sectional shape of the main unit 2 along the window center axis Z0. As illustrated, the thin control drive circuit 17 (See FIG. 4), backlight 12, LCD 13, and optical filter 14 are layered and the bottoms thereof tilted upward away from each window frame (backward). Moreover, the prism 15 elongated lengthwise is supported below the optical filter 14 with the apex of the substantially triangular cross section thereof located therebelow as seen in the drawing.

The outline of the main unit 2 shielding the LCDs 13, prisms 15, and others is determined under the condition that no wasted space is created when the LCDs, prisms, and other elements are arranged therein. In particular, each Z0-axis cross section of the main unit 2 is shaped so that the upper angular area Ca and lower angular area Cb can be defined on the surface of the front cover as having a collective height Sc and thickness Sd. The height Sc is a dimension in the Y direction of the main unit 2, and the thickness Sd is a dimension in the Z0 direction. When this outline is adopted, the volume and surface area of the main unit can be reduced. Moreover, the main unit can be designed to be lightweight. The present inventor has come to the conclusion that the thickness Sd of the main unit should preferably be between about 20 mm and 35 mm. This conclusion has been reached through various experiments and trials to test different dimensions of the accommodated members and the handling efficiency of the HMD.

Each Z0-axis cross section of the front cover 3 is shaped in such a manner that the front cover 3 has an apex P0 projecting in a direction opposite to each window frame. Moreover, the front cover 3 has its outer surface composed of surfaces 3a and 3b tangent to lines Ea and Eb inclined upward and downward respectively from near the apex P0 towards each window frame. The front cover has a predetermined thickness. Moreover, the level position of the apex P0 in the Y direction of the front cover is located near the top of the main unit, which has a height Sc. In other words, the apex P0 is located relatively upward long the vertical dimension Sc of the housing body. With the front cover 3 having a smaller dimension Sa in FIG. 3 than a dimension Sb.

Figure 5A:
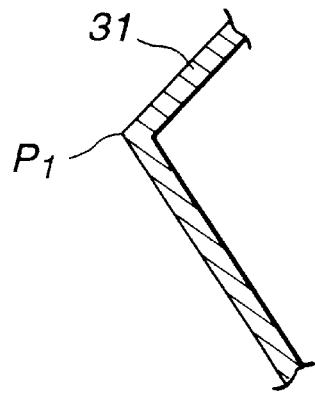
FIG. 5A is a partial cross sectional view showing the shape of apices of a front cover of a variant of the HMD shown in FIG. 1.
Figure 5B:
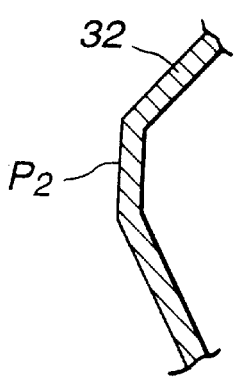
FIG. 5B is a partial cross sectional view showing the shape of apices of a front cover of another variant of the HMD shown in FIG. 1.

The shape of the apex of the front cover 3 is not limited to that of the apex P0 having a predetermined curvature indicated in the cross sectional view of FIG. 3. For example, an angular apex P1 shown in the partial cross sectional view of a front cover 31 of FIG. 5A will also do. Another alternative is a convex part P2 having a planar portion like the one shown in the partial cross sectional view of a front cover 32 of FIG. 5B.

Figure 6:
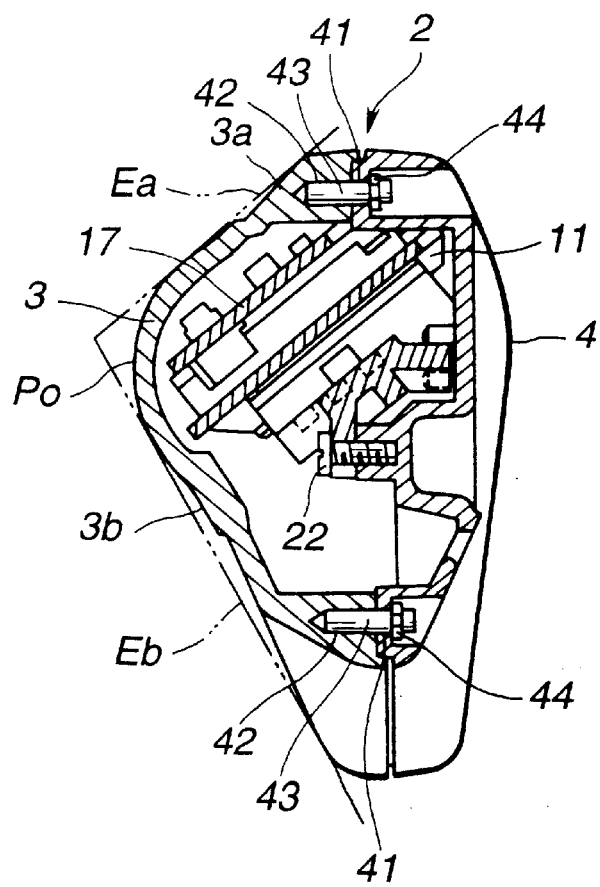
FIG. 6 is a vertical cross sectional view showing the structures of coupled front and back covers of a variant of the HMD shown in FIG. 1.
Figure 7:
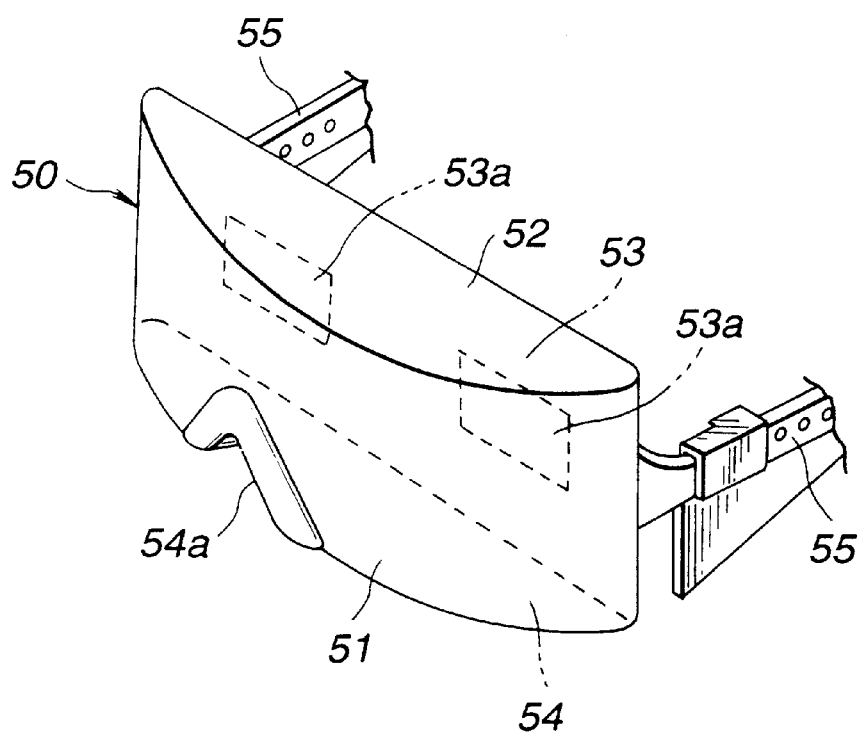
FIG. 7 is a perspective view of a main unit of a conventional head-mounted picture display device.

Moreover, a means for coupling the front cover 3 with the back cover 4 is not limited to the headed screws 21. Alternatively, as shown in the vertical cross sectional view of FIG. 6, the front cover and back cover may be coupled with each other by means of fixing shafts 43 and E-shaped snap rings 44. The fixing shafts 43 are press-fitted into supporting holes 42 in the front cover 3, and the E-shaped snap rings 44 serve as flanges. Passage holes 41 through which the fixing shafts 43 are passed are bored in the back cover 4. Openings having a larger diameter than the passage holes 41 are created behind the passage holes 41. The E-shaped snap rings 44 can thus be inserted into the openings.

One of the constituent features of the present invention described in conjunction with FIG. 3 and FIG. 4 will be summarized below. That is to say, each picture display member formed with the LCD 13 and each optical system formed with the prism 15 are arranged so that their positional relationship will be a predetermined fixed. The assembly of the LCD 13 and prism 15 (picture visualization unit) is shaped to have an apex at a predetermined level position along the vertical dimension of the housing body. The assembly thereof thus projects in a direction opposite to each window frame. The front cover is outlined in conformity with the projecting shape of the assembly to lie closely to the assembly.

For viewing a picture, the thus-structured HMD 1 has the main unit 2 thereof mounted on the observer's head 31. In this state, a picture represented by a video signal transmitted via the controller is displayed on the LCDs 13. Light emanating from the backlights 12 is transmitted by the LCDs 13 and optical filters 14. The light falls as picture light L0 on the prisms 15, and reflects therefrom. The reflected light then travels as picture light L2 to the eyes 32 of the observer's head 31. The light forms the picture image on the retinas of the eyes 32. Thus, the picture is viewed by the observer.

According to the foregoing HMD 1, as shown in FIG. 3, the outer surface of the front cover 3 of the main unit 2 is shaped to have two surfaces inclined upward and downward respectively with the apex formed between the two surfaces. This leads to a minimization of space around the LCDs 13, prisms 15, and other members stowed in the main unit. Consequently, the main unit can be designed compactly, and the surface area of the main unit 2 decreases at the same time. This leads to a lightweight main unit.

Furthermore, the upper and lower outer surfaces of the front cover 3 are inclined to such an extent that the angular areas Ca and Cb can be, as shown in FIG. 3, defined in front of the front cover 3. When the HMD 1 is mounted on the user's head 31, only a limited sense of coerciveness will be given to a third party other than the observer. Moreover, when the thickness Sd of the main unit is set to be between about 20 mm and 35 mm, the HMD 1 can be mounted on the head 31 without a significant discomfort. This leads to a user-friendly head-mounted picture display device.

As mentioned above, according to the head-mounted picture display device of the present invention, each vertical section of the front cover has two surfaces thereof which extend along lines inclined upward and downward towards each window frame from near each apex. The main unit can therefore be designed to be lightweight.

Moreover, the apices or convex parts of the front cover are located near the top thereof. The front cover is thus outlined in conformity with the overall shape of the members incorporated in the main unit. This results in a limiting any unnecessary space in the main unit. Furthermore, since the thickness of the main unit is set to be between about 20 mm and 35 mm, a feeling of heaviness or imbalance will not be experience upon mounting the HMD. The handling efficiency will therefore not be deteriorated.

Moreover, the bottoms of the picture display members are arranged to tilt backwards away from the window frames in the upper area of the main unit. Furthermore, the longitudinal cross sections of the optical systems are shaped substantially like a triangle and arranged to have their apices located below the picture display. Any members unnecessary space in the main unit is therefore very small.

Moreover, the front cover 3 has the screw holes 3d and the inner circumferential parts 3c. The screw holes 3d serve as supporting to mesh with the headed screws 21 (screw members) that serve as fastening members with flanges. The projections 4c of the back cover 4 are fitted into the inner circumferential parts 3c. The back cover 4 has, in addition to the projections 4c, the passage holes 4b and openings 4d. The screws 21 the are passed through the passage holes 4b. The openings 4d have a larger diameter than the passage holes 4b. The heads of the screws 21 can thus be inserted into the openings 4d. The front cover and back cover are secured together by the screw members, with the projections of the back cover fitted into the inner circumferential parts of the front cover. With this construction, invasion or adhesion of dust or the like to the optical members in the main unit can be prevented reliably.

What is claimed is:

1. A housing body for accommodating components of a head-mounted picture display device including picture display members and optical systems for projecting pictures appearing on the picture display members to an observer's eyes so as to retain the components at viewable positions at which the picture display members and optical systems are located closely to or in contact with the observer's head, the housing body comprising:
   a back cover member having,
      a pair of window frames formed at positions at which, when an observer assumes a predetermined viewing posture, the window frames are opposed to the observer's eyes, the window frames each holding a transparent window member,
      passage holes through which fastening members can be passed, and
      projection members;
   a front cover member mounted on the back cover member, the front cover member including,
      at least one convex portion and first and second inclining portions integral with and extending away from the at least one convex portion,
      supporting holes in which fastening members can be locked and supported, and
      inner circumferential parts into which the projection members of the back cover are fitted; and
   fastening members passed through the passage holes of the back cover member and locked in the supporting holes of the front cover member, each fastening member having a flange with a diameter larger than that of the respective passage hole,
   wherein the back cover member and front cover member are secured with the projection members of the back cover member fitted into the inner circumferential parts of the front cover member and with the fastening members locked in the supporting holes of the front cover member.

2. A housing body for accommodating components of a head-mounted picture display device including picture display members and optical systems for projecting pictures appearing on the picture display members to an observer's eyes so as to retain the components at viewable positions at which the picture display members and optical systems are located closely to or in contact with the observer's head, the housing body comprising:
   a back cover member having
      a pair of window frames formed at positions at which, when an observer assumes a predetermined viewing posture, the window frames are opposed to the observer's eyes, the window frames each holding a transparent window member,
      passage holes through which fastening members can be passed, and
      projection members;
   a front cover member integrally fixed to the back cover member and formed by a first surface inclined from substantially a central horizontal axis of the window frames upward toward the window frames, and a second surface inclined from substantially the central horizontal axis of the window frames downward toward the window frames, so as to form an apexed or convex portion extending parallel to the central horizontal axis of the window frames and projecting in a direction opposite to each window frame, the front cover member having
      supporting holes in which fastening members can be locked and supported, and
      inner circumferential parts into which the projection members of the back cover are fitted; and
   fastening members passed through the passage holes of the back cover member and locked in the supporting holes of the front cover member, each fastening member having a flange with a diameter larger than that of the respective passage hole,
   wherein the back cover member and front cover member are integrally secured with the projection members of the back cover member fitted into the inner circumferential parts of the front cover member and with the fastening members locked in the supporting holes of the front cover member, and wherein the fastening members are screw members having screw portions and heads serving as the flanges larger in diameter than that of the passage holes and also the screw portions, and the supporting holes bored in the front cover member are screw holes with which the screw portions are meshed.

3. A housing body for accommodating components of a head-mounted picture display device including picture display members and optical systems for projecting pictures appearing on the picture display members to an observer's eyes so as to retain the components at viewable positions at which the picture display members and optical systems are located closely to or in contact with the observer's head, the housing body comprising:

a back cover member having
  a pair of window frames formed at positions at which, when an observer assumes a predetermined viewing posture, the window frames are opposed to the observer's eyes, the window frames each holding a transparent window member,
  passage holes through which fastening members can be passed, and
  projection members;

a front cover member integrally fixed to the back cover member and formed by a first surface inclined from substantially a central horizontal axis of the window frames upward toward the window frames, and a second surface inclined from substantially the central horizontal axis of the window frames downward toward the window frames, so as to form an apexed or convex portion extending parallel to the central horizontal axis of the window frames and projecting in a direction opposite to each window frame, the front cover member having
  supporting holes in which fastening members can be locked and supported, and
  inner circumferential parts into which the projection members of the back cover are fitted; and fastening members passed through the passage holes of the back cover member and locked in the supporting holes of the front cover member, each fastening member having a flange with a diameter larger than that of the respective passage hole, wherein the back cover member and front cover member are integrally secured with the projection members of the back cover member fitted into the inner circumferential parts of the front cover member and with the fastening members locked in the supporting holes of the front cover member, and wherein, when the projections of the back cover member are fitted into the inner circumferential parts of the front cover member, the coupling plane on which the front and back cover members are joined is stepped so that the lower part thereof extends further backward than the upper part thereof with the step between the upper and lower parts being formed substantially along a center line across the coupling plane.

4. A head-mounted picture display device comprising:
picture display members;
optical systems for projecting pictures appearing on the picture display members to an observer's eyes; and
a housing body accommodating the picture display members and optical systems to retain them at viewable positions at which the picture display members and optical systems are located closely to or in contact with the observer's head, wherein the housing body includes:
  a back cover member having a pair of window frames located at positions at which, when an observer assumes a predetermined viewing posture, the window frames are opposed to the observer's eyes, each window frame holding a transparent window member; and
  a front cover member mounted on the back cover member, the front cover member including,
    at least one convex portion and first and second inclining portions integral with and extending away from the at least one convex portion to define an interior portion having an interior surface, wherein one of the picture display members and one of the optical systems are arranged substantially along the interior surface.

5. The head-mounted picture display device of claim 4, wherein when the front cover member is mounted on the back cover member a maximum front-to-back thickness of the device is between about 20 mm and 35 mm.

6. A head-mounted picture display device comprising:
picture display members;
optical systems for projecting pictures appearing on the picture display members to an observer's eyes; and
a housing body accommodating the picture display members and optical systems to retain them at viewable positions at which the picture display members and optical systems are located closely to or in contact with the observer's head, wherein the housing body includes:
  a back cover member having a pair of window frames located at positions at which, when an observer assumes a predetermined viewing posture, the window frames are opposed to the observer's eyes, each window frame holding a transparent window member; and
  a front cover member integrally fixed to the back cover member and formed by a first surface inclined from substantially a central horizontal axis of the window frames upward toward the window frames and a second surface inclined from substantially the central horizontal axis of the window frames downward toward the window frames, so as to form an apexed or convex portion extending parallel to the central horizontal axis of the window frames and projecting in a direction opposite to each window frame,
wherein, when the back cover member and front cover member are integrally secured, the back-to-front thickness of the apexed or convex portion is between about 20 mm and 35 mm, and wherein the vertical of the apexed or convex portion extending parallel to the central horizontal axis of each window frame is located relatively closer to the top of the housing body than to the bottom thereof.

7. A head-mounted picture display device comprising:
picture display members;
optical systems for projecting pictures appearing on the picture display members to an observer's eyes; and
a housing body accommodating the picture display members and optical systems to retain them at viewable positions at which the picture display members and optical systems are located closely to or in contact with the observer's head, wherein the housing body includes:
  a back cover member having a pair of window frames located at positions at which, when an observer assumes a predetermined viewing posture, the window frames are opposed to the observer's eyes, each window frame holding a transparent window member; and a front cover member integrally fixed to the back cover member and formed by a first surface inclined from substantially a central horizontal axis of the window frames upward toward the window frames and a second surface inclined from substantially the central horizontal axis of the window frames downward toward the window frames, so as to form an apexed or convex portion extending parallel to the central horizontal axis of the window frames and projecting in a direction opposite to each window frame, wherein, when the back cover member and front cover member are integrally secured, the back-to-front thickness of the apexed or convex portion is between about 20 mm and 35 mm, and wherein the relative positional relationship between each picture display member and corresponding optical system is predetermined and fixed, such that the assembly of each picture display member and optical system is shaped to have an apex at a predetermined position along the vertical dimension of the housing body to thus project in a direction opposite to each window frame, and wherein the front cover is shaped in conformity with the projecting shape to lie closely to the assembly of each picture display member and optical system.

* * * * *